United States Patent [19]

Motoe et al.

[11] Patent Number: 4,972,259
[45] Date of Patent: Nov. 20, 1990

[54] ADAPTIVE COMB FILTER CIRCUIT INCLUDING A PLURALITY OF FILTERS AND A SWITCHING MEANS WHICH RESULTS IN IMPROVED MOVEMENT DETECTION IN TELEVISION SIGNALS

[75] Inventors: Hisafumi Motoe; Hiroyuki Kawashima, both of Tokyo; Masaharu Tokuhara, Kanagawa, all of Japan

[73] Assignee: Sony Corporation, Tokyo, Japan

[21] Appl. No.: 379,054

[22] Filed: Jul. 13, 1989

[30] Foreign Application Priority Data

Jul. 22, 1988 [JP] Japan .................................. 63-183203
Jul. 22, 1988 [JP] Japan .................................. 63-183204
Jul. 28, 1988 [JP] Japan .................................. 63-189474

[51] Int. Cl.$^5$ .................................................. H04N 9/78
[52] U.S. Cl. ...................................... 358/105; 358/31; 358/36
[58] Field of Search .................... 358/105, 31, 36, 37

[56] References Cited

U.S. PATENT DOCUMENTS

| | | | |
|---|---|---|---|
| 4,616,254 | 10/1986 | Harwood et al. | 358/36 X |
| 4,617,589 | 10/1986 | Weckenbrock | 358/36 X |
| 4,686,561 | 8/1987 | Harwood et al. | 358/31 |
| 4,700,232 | 10/1987 | Abt et al. | 358/105 X |
| 4,809,060 | 2/1989 | Saeki | 358/31 |

Primary Examiner—Victor R. Kostak
Attorney, Agent, or Firm—Hill, Van Santen, Steadman & Simpson

[57] ABSTRACT

A moving detection circuit which has a difference level generator which includes at least a frame delay circuit, and a vertical correlation detector which is connected to the difference signal generator and including a plurality of filters connected to the difference signal generator. A switching circuit for selecting one of the plurality of filters is provided and a control circuit is connected to the vertical correlation detector so as to control the switching circuit in response to the output level of the vertical correlation detector.

14 Claims, 10 Drawing Sheets

FIG. 17H ated to a moving detection circuit and more particularly to a moving detection circuit for generating a moving detection signal which is utilized in a television receiver such as a so-called improved definition television receiver (IDTV) for providing an improved image quality by using movement-adaptive type scanning line interpolation or the like.

ADAPTIVE COMB FILTER CIRCUIT INCLUDING A PLURALITY OF FILTERS AND A SWITCHING MEANS WHICH RESULTS IN IMPROVED MOVEMENT DETECTION IN TELEVISION SIGNALS

CROSS-REFERENCES TO RELATED APPLICATIONS

This application is related to application entitled "A SIGNAL PROCESSING CIRCUIT FOR A MOVING DETECTION CIRCUIT" in which the inventors are H. Motoe, H. Kawashima and M. Tokunara assigned to the assignee of the present application identified as attorney case number P89,1346.

BACKGROUND OF THE INVENTION

1. Field of the Invention

The present invention relates generally to a moving detection circuit and more particularly to a moving detection circuit for generating a moving detection signal which is utilized in a television receiver such as a so-called improved definition television receiver (IDTV) for providing an improved image quality by using movement-adaptive type scanning line interpolation or the like.

2. Description of the Prior Art

Figure 1:
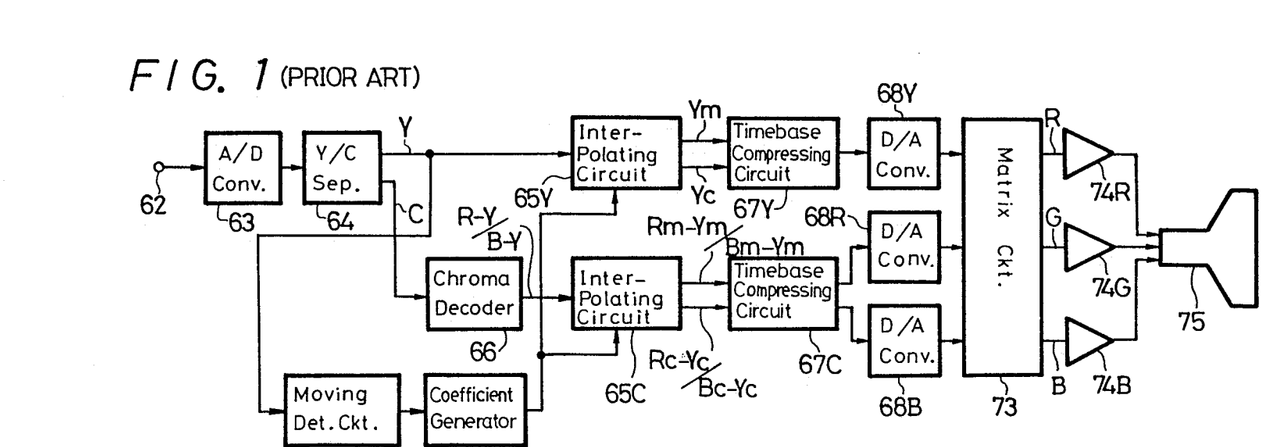
FIG. 1 is a block diagram showing an example of a prior art television receiver which has a moving detection circuit.

FIG. 1 is a block diagram showing an example of a prior art television receiver.

Referring to FIG. 1, a video signal is applied to an input terminal 62 and is supplied to an analog-to-digital (A/D) converter 63, where it is converted to a digital video signal. The digital video signal is then fed to a Y/C separating circuit 64, in which it is separated to provide a luminance signal Y and a chrominance signal C.

The luminance signal Y from the Y/C separating circuit 64 is supplied to a scanning line interpolating circuit 65Y. The chrominance signal C from the Y/C separating circuit 64 is supplied to a chroma decoder 66, where it is decoded to provide a time-division signal R-Y/B-Y of red and blue color difference signals R-Y and B-Y. The time-division signal R-Y/B-Y from the chroma decoder 66 is supplied to a scanning line interpolating circuit 65C. The scanning line interpolating circuits 65Y and 65C generate main scanning line signals Ym and Rm-Ym/Bm-Ym in addition to the interpolating scanning line signals Yc and Rc-Yc/Bc-Yc simultaneously.

The luminance signal Y from the Y/C separating circuit 64 is supplied to a moving detection circuit 50. The moving detection signal from the moving detection circuit 50 is supplied to a coefficient generator 51. The amplifying value K of the multipliers in the scanning line interpolating circuits 65Y and 65C is generated by the coefficient generator 51, and the value K changes in response to the magnitude of the moving detection signal. For example, K = 0 for the still picture portion and the maximum value of K is 1 for the rapid moving picture portion.

The moving detection circuit 50 will be described more fully with reference to FIG. 2.

Figure 2:
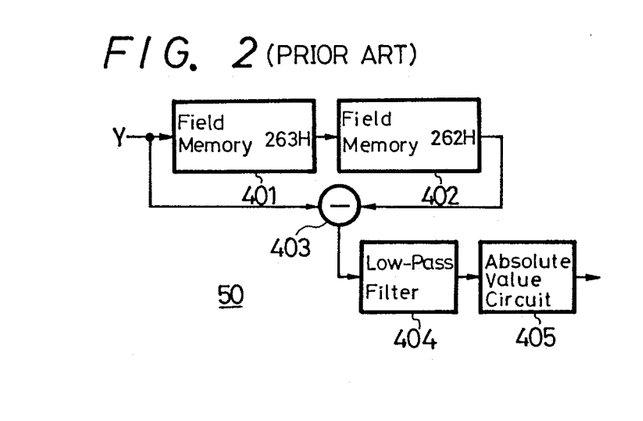
FIG. 2 is a schematic block diagram showing an example of a prior art moving detection circuit used in the television receiver shown in FIG. 1.

Referring to FIG. 2, the luminance signal Y from the Y/C separating circuit 64 (see FIG. 1) is supplied to a series circuit comprising field memories 401 and 402 each of which form a delay line. The delay time of the series circuit of the field memories 401 and 402 is one frame (263H + 262H).

The input signal to the field memory 401 and the output signal from the field memory 402 are supplied to a subtracter 403, where they are subtracted from each other. The frame difference signal from the subtracter 403 is supplied to a low-pass filter 404, in which the high band noise component and the dot interference component thereof are removed. The thus processed signal from the low-pass filter 404 is supplied to an absolute value circuit 405 where it is converted to an absolute value. The output signal from the absolute value circuit 405 is the moving detection signal.

Japanese Laid-Open Pat. No. 55-8124 discloses the above technique in which the moving detection signal is detected from the frame difference signal.

Figure 3:
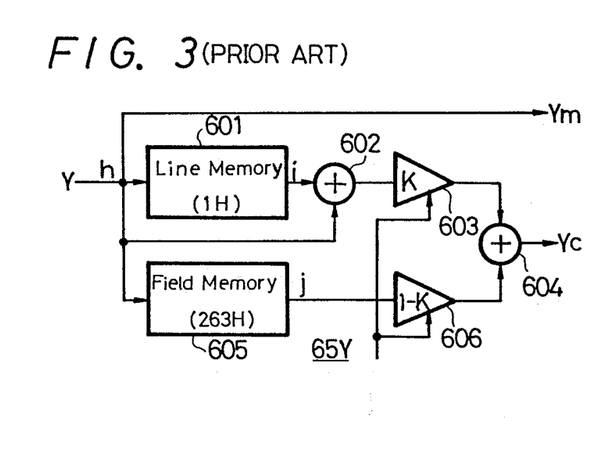
FIG. 3 is a schematic block diagram showing an example of a prior art scanning line interpolating circuit used in the television receiver shown in FIG. 1.

The scanning line interpolation circuit 65Y is constructed, for example, as shown in FIG. 3.

Referring to FIG. 3, the luminance signal Y delivered from the Y/C separating circuit 64 (see FIG. 1) is supplied to a line memory 601 which forms a delay line which has a delay time of 1H (one horizontal line period). The input and output signals of the line memory 601 are supplied to an adder 602, where they are added and averaged. The output signal from the adder 602 is multiplied by K (K ≦ 1) by a multiplier 603, and is then fed to an adder 604.

The luminance signal Y from the Y/C separating circuit 64 (FIG. 1) is also supplied to a field memory 605 which forms a delay line. The delay time of the field memory 605 is selected to be 263H. The output signal from the field memory 605 is multiplied by (1 - K) by a multiplier 606, and is then fed to the adder 604.

Figure 4:
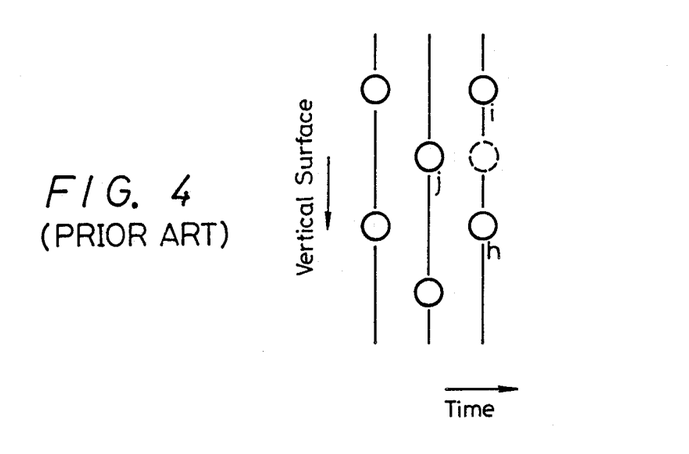
FIG. 4 is a schematic diagram showing a scanning line structure of the prior art scanning line interpolating circuit from a time and vertical surface standpoint.

FIG. 4 shows a scanning line structure from a time-vertical surface standpoint. In FIG. 4, an open circle represents the scanning line of each field. Assuming that h is the above-mentioned input signal, that i is the output signal of the line memory 601 and that j is the output signal of the field memory 605, and these signals h to j are arranged to have a positional relationship such as shown in FIG. 4.

In the scanning line interpolating circuit 65Y, the output signal h + i of the adder 602 is an interpolating scanning line signal which represents the real moving picture portion, whereas the output signal j of the field memory 605 is the interpolating scanning line signal which represents the still picture portion. The adder 604 generates an output which is an interpolating scanning line signal Yc in which the interpolating scanning line signals of the real moving picture and of the still picture portion are added at a ratio corresponding to the amount of movement. The scanning line which is to be interpolated is located as shown by a broken line circle in FIG. 4.

The input signal h is directly utilized as the main scanning line signal Ym.

The scanning line interpolating circuit 65C is similarly constructed and is not described in detail.

Referring back to FIG. 1, the main scanning line signals Ym and Rm-Ym/Bm-Ym and the interpolating scanning line signals Yc and Rc-Yc/Bc-Yc from the scanning line interpolating circuits 65Y and 65C are supplied to timebase-compressing circuits 67Y and 67C, respectively. The timebase-compressing circuits 67Y and 67C time-compress each of the main scanning line signals Ym, Rm-Ym/Bm-Ym and the interpolating scanning line signals Yc, Rc-Yc/Bc-Yc by one half respectively, and the signals are sequentially generated.

In this case, the timebase-compressing circuit 67C generates red and blue color difference signals separately.

The double-speed luminance signal and color difference signals from the timebase-compressing circuits 67Y and 67C are supplied to digital-to-analog (D/A) converters 68Y, 68R and 68B, in which they are converted to analog signals, respectively.

The double-speed luminance signal and color difference signals from the D/A converters 68Y, 68R and 68B are supplied to a matrix circuit 73. The double-speed red, green and blue signals R, G and B from the matrix circuit 73 are respectively supplied through amplifiers 74R, 74G and 74B to a color cathode ray tube (color CRT) 75, where a color video signal which has double the normal scanning lines is displayed on the screen of the color CRT 75 according to the non-interlaced scanning system.

The television receiver shown in the example of FIG. 1 is disclosed, for example, in NEC technical report Vol. 41, No. 3/1988.

The chrominance signal component has a phase-inverting relationship between the frames so that when the luminance signal y contains the dot interference component, the output signal of the subtracter 403 (FIG. 2) also contains the dot interference component.

Figure 5:
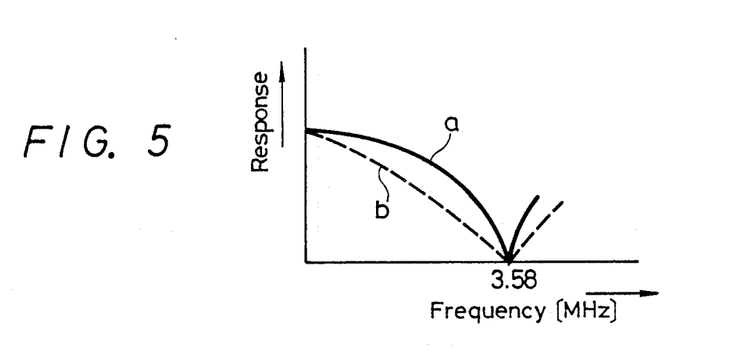
FIG. 5 is a diagram of the spectrum showing a frequency characteristic of a low-pass filter used in a moving detection circuit of the present invention.

In the moving detection circuit 50 shown in the example of FIG. 2, when the low-pass filter 404 is formed as a so-called COS filter which has a frequency response characteristic which becomes lower around, for example, 3.58 MHz (refer to a solid line curve a in FIG. 5), movement of relatively high frequency can be detected. There is, however, presented such a problem in that the dot interference component (chrominance signal component) contained in the output signal from the subtracter 403 cannot be effectively removed. When on the other hand the low-pass filter 404 is formed as a so-called $COS^2$ filter which has a response characteristic which becomes lower around, for example, 3.58 MHz (refer to a broken line curve b in FIG. 5), the dot interference component can effectively be removed but the moving detection ability so as to detect movement of a relatively high frequency is deteriorated.

Further, in the moving detection circuit 50 shown in FIG. 2, the frame difference signal is used as the moving detection signal, and the moving detection is performed during a unit of a frame frequency (1/30 second). There is then a problem because a quick movement such as a field frequency (1/60 second) cannot be detected, which fact causes a detection error to occur. This will be described more fully with reference to FIGS. 6A to 6D and FIGS. 7A to 7D.

Figure 6A:
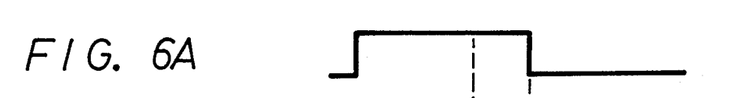
FIGS. 6A to 6D are respectively schematic representations used to explain that the prior art moving detection circuit is normally operated when the moving speed is low.
Figure 6B:
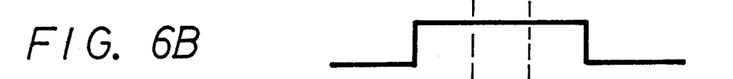
Figure 6C:
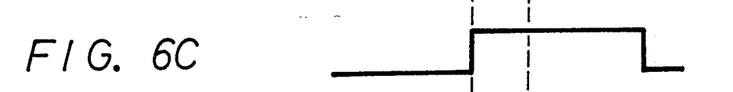
Figure 6D:
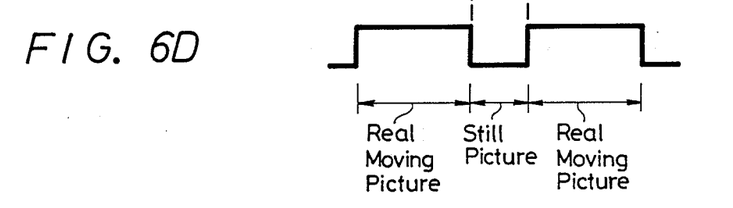

FIGS. 6A, 6B and 6C respectively illustrate examples of luminance signals Y of two-fields before, one field before and the present field when the moving speed is low. In this case, the subtracter 403 generates an output signal such as shown in FIG. 6D, which does not have a detection error.

Figure 7A:
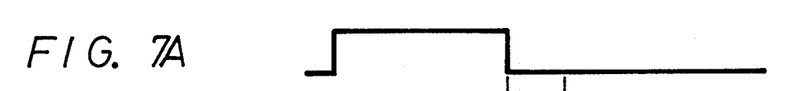
FIGS. 7A to 7D are respectively schematic representations used to explain that the prior art moving detection circuit is not normally operated when the moving speed is high.
Figure 7B:
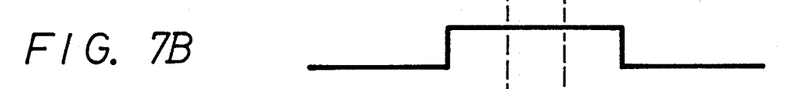
Figure 7C:
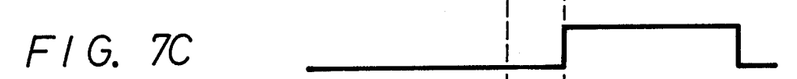
Figure 7D:
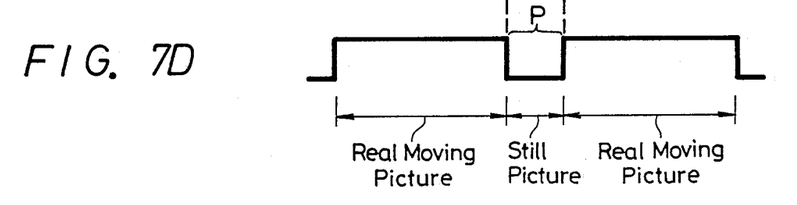

FIGS. 7A, 7B and 7C respectively illustrate examples of luminance signal Y of two-fields before, one field before and the present field when the moving speed is high. In this case, the subtracter 403 generates an output signal such as shown in FIG. 7D of which a portion P is the still picture portion. Thus, the movement in the unit of the field frequency cannot be detected, which fact causes a detection error.

To prevent a detection error from being caused when the moving speed is high, it is proposed to detect the movement by utilizing three or more field memories. This inevitably increases the memory capacity. Further, it is also proposed that a time base filter or the like be connected to the stage succeeding the moving detection circuit so as to remove the detection error. This proposal, however, requires more field memories, which fact causes the circuit scale to be increased.

OBJECTS AND SUMMARY OF THE INVENTION

It is an object of the present invention to provide an improved moving detection circuit which can remove the above defects inherent in the prior art.

More specifically, it is an object of the present invention to provide a moving detection circuit which can effectively remove a dot interference component at the vertical edge.

It is another object of the present invention to provide a moving detection circuit which can adequately detect motion of a relatively high frequency.

It is still another object of the present invention to provide a moving detection circuit which can detect quick motion in the field frequency unit.

It is still another object of the present invention to provide a moving detection circuit which can prevent detection errors and also the occurrence of line flicker.

It is a further object of the present invention to provide a moving detection circuit which can considerably increase the ability to detect.

According to an aspect of the present invention, there is provided a moving detection circuit comprising a difference signal generator including at least a frame delay circuit, and a vertical correlation detector which is connected to said difference signal generator characterized by:
 (1) a plurality of filters connected to said difference signal generator;
 (2) switching means for selecting one of said plurality of filters; and
 (3) control means connected to said vertical correlation detector for controlling said switching means in response to the output level of said vertical correlation detector.

These and other objects, features and advantages of the present invention will be apparent from the following detailed description of preferred embodiments when read in conjunction with the accompanying drawings, in which like reference numerals identify the same or similar parts in the several views.

DETAILED DESCRIPTION OF PREFERRED EMBODIMENTS

A first embodiment of the moving detection circuit according to the present invention will hereinafter be described with reference to FIG. 8.

Figure 8:
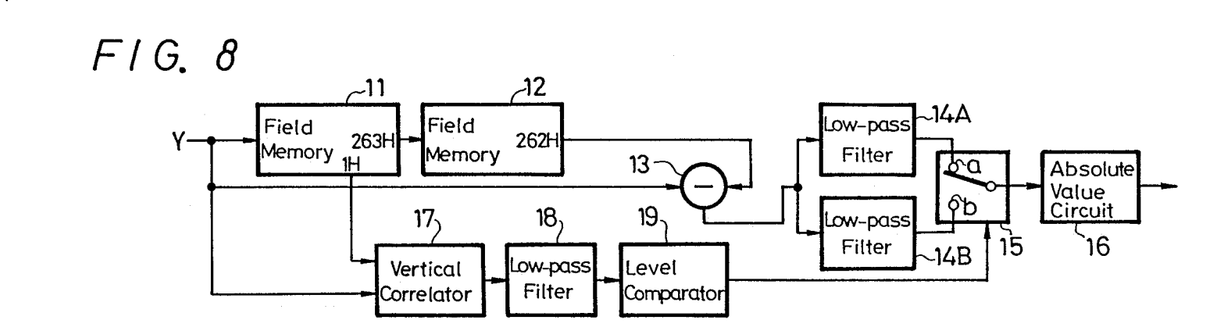
FIG. 8 is a block diagram showing an embodiment of a moving detection circuit according to the present invention.

Referring to FIG. 8, a luminance sign Y is separated from an input video signal by a comb-filter (not shown) which uses for example, a line correlation which is supplied to a field memory 11 which forms a delay line. The field memory 11 is formed of a so-called 3-port field memory and has a first output terminal which has a time delay of 263H and a second output terminal has a time delay of 1H, where H is one horizontal line period. The output signal developed at the first output terminal of the field memory 11 is supplied to a field memory 12 which forms a delay line and the time delay of the field memory 12 is selected to be 262H. Thus, the time delay of the series circuit of the field memories 11 and 112 is selected to be one frame (263H +262H).

The input signal to the field memory 11 and the output signal from the field memory 12 are supplied to a subtracter 13, where they are subtracted from each other to provide a frame difference signal. The frame difference signal from the subtracter 13 is supplied to low-pass filters 14A and 14B, one of which is used to remove a high band noise component and the other to remove a dot interference component. The low-pass filter 14A might be a COS filter which has a frequency response characteristic which is around 3.58 MHz which corresponds to a frequency of, for example, the dot interference component. The frequency characteristic of the low-pass filter 14A is represented by the solid line a in FIG. 5. On the other hand, the low-pass filter 14B might be a $COS^2$ filter which has a frequency response characteristic which is around 3.58 MHz which corresponds to a frequency of, for example, the dot interference component. The frequency characteristic of the low-pass filter 14B is represented by the broken line b in FIG. 5.

The output signals from the low-pass filters 14A and 14B are supplied to fixed contacts a and b of a change-over switch 15, respectively. The output signal from the change-over switch 15 is supplied to an absolute value circuit 16, where it is converted to an absolute value. The output signal from the absolute value circuit 16 is a moving detection signal.

Referring to FIG. 8, there is shown a vertical correlator 17 which is supplied the input signal to the field memory 11 and the output signal developed at the second output terminal of the field memory 11. The vertical correlator 17 generates an absolute value of a line difference signal. The output signal from the vertical correlator 17 is supplied through a low-pass filter 18 which removes noise components, to a level comparator 19. The level comparator 19 generates a signal of high level "1" when the line difference signal supplied thereto is higher than a predetermined level and a signal of low level "0" when it is lower than the predetermined level. In other words, the level comparator 19 generates a signal of low level "0" in the vertical correlation portion and a signal of high level "1" in the vertical non-correlation portion (vertical edge).

The above-mentioned change-over switch 15 is controlled by the output signal of the level comparator 19, and the fixed contact a is engaged during the vertical correlation portion and the fixed contact b during the vertical non-correlation portion.

In this embodiment of the moving detection circuit thus arranged, the attenuation factor is switched to the steep lowpass filter 14B during the vertical non-correlation portion (vertical edge) so that the dot interference component frequency contained in the vertical edge can be effectively removed. Further, during the vertical correlation portion (the portion which is not the vertical edge), the attenuation factor is switched to the gentle low-pass filter 14A so that a movement of relatively high frequency can be detected.

A second embodiment of the moving detection circuit according to the present invention will be described hereinunder with reference to FIGS. 9 and 10.

Figure 9:
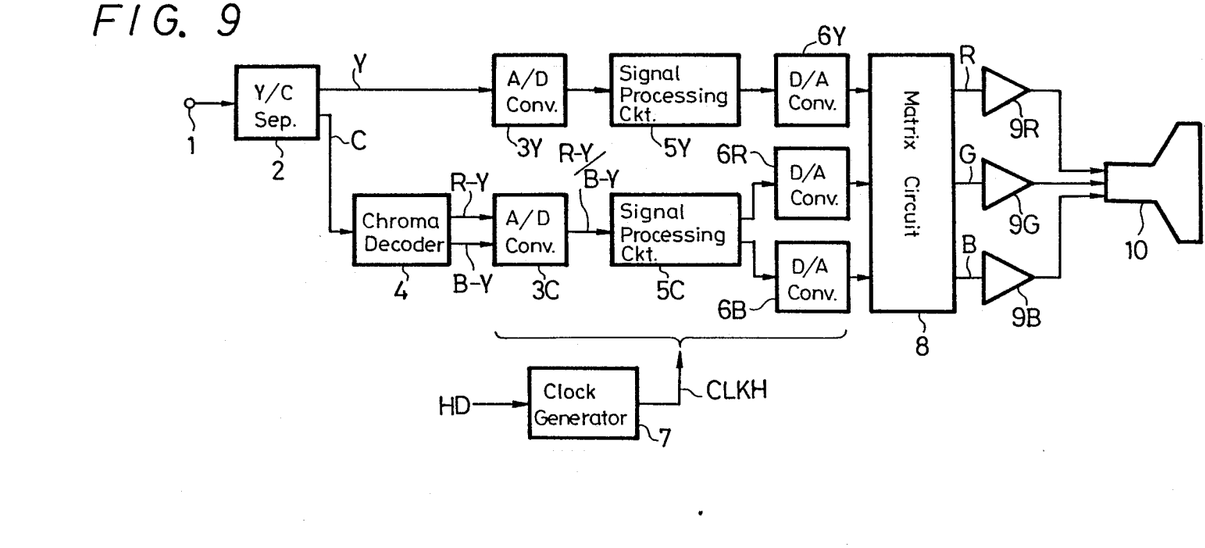
FIG. 9 is a block diagram showing an example of a television receiver to which the present invention is applied.

Referring initially to FIG. 9, a video signal which is applied to an input terminal 1 is supplied to a Y/C separating circuit 2, in which it is separated to form a luminance signal Y and a chrominance signal C. The Y/C separating circuit 2 is formed of a comb-filter which makes effective use of, for example, a line correlation.

The luminance signal Y from the Y/C separating circuit 2 is converted to a digital signal by an A/D converter 3Y, and is then fed to a signal processing circuit 5Y. The chrominance signal C from the Y/C separating circuit 2 is supplied to a chroma decoder 4, in which it is decoded to provide red and blue color difference signals R-Y and B-Y. The red and blue color difference signals R-Y and B-Y from the chroma decoder 4 are supplied to an A/D converter 3C, in which they are converted to digital signals, and are then fed to a signal processing circuit 5C as time-division signals R-Y/BY.

The signal processing circuits 5Y and 5C perform signal processing such as interpolating the scanning line and the like. The double-speed luminance signal and color difference signals from the signal processing circuits 5Y and 5C are converted to analog signals by D/A converters 6Y, 6R and 6B, respectively.

In FIG. 9 there is shown a clock generator 7. When it is supplied with a horizontal synchronizing signal HD separated from the video signal, the clock generator 7 generates a clock signal CLKH which is phase-locked to the horizontal synchronizing signal HD. The clock signal CLKH from the clock generator 7 is supplied to a digital processing system and to the A/D converters 3Y and 3C and to the D/A converters 6Y, 6R and 6B.

The double-speed luminance signal and color difference signals from the D/A converters 6Y, 6R and 6B are supplied to a matrix circuit 8. The double-speed red, green and blue signals R, G and B from the matrix circuit 8 are supplied through amplifiers 9R, 9G and 9B to a color CRT 10, where a video signal is displayed on the screen of the color CRT 10 according to the non-interlaced scanning system in which the number of scanning lines is doubled.

Figure 10:
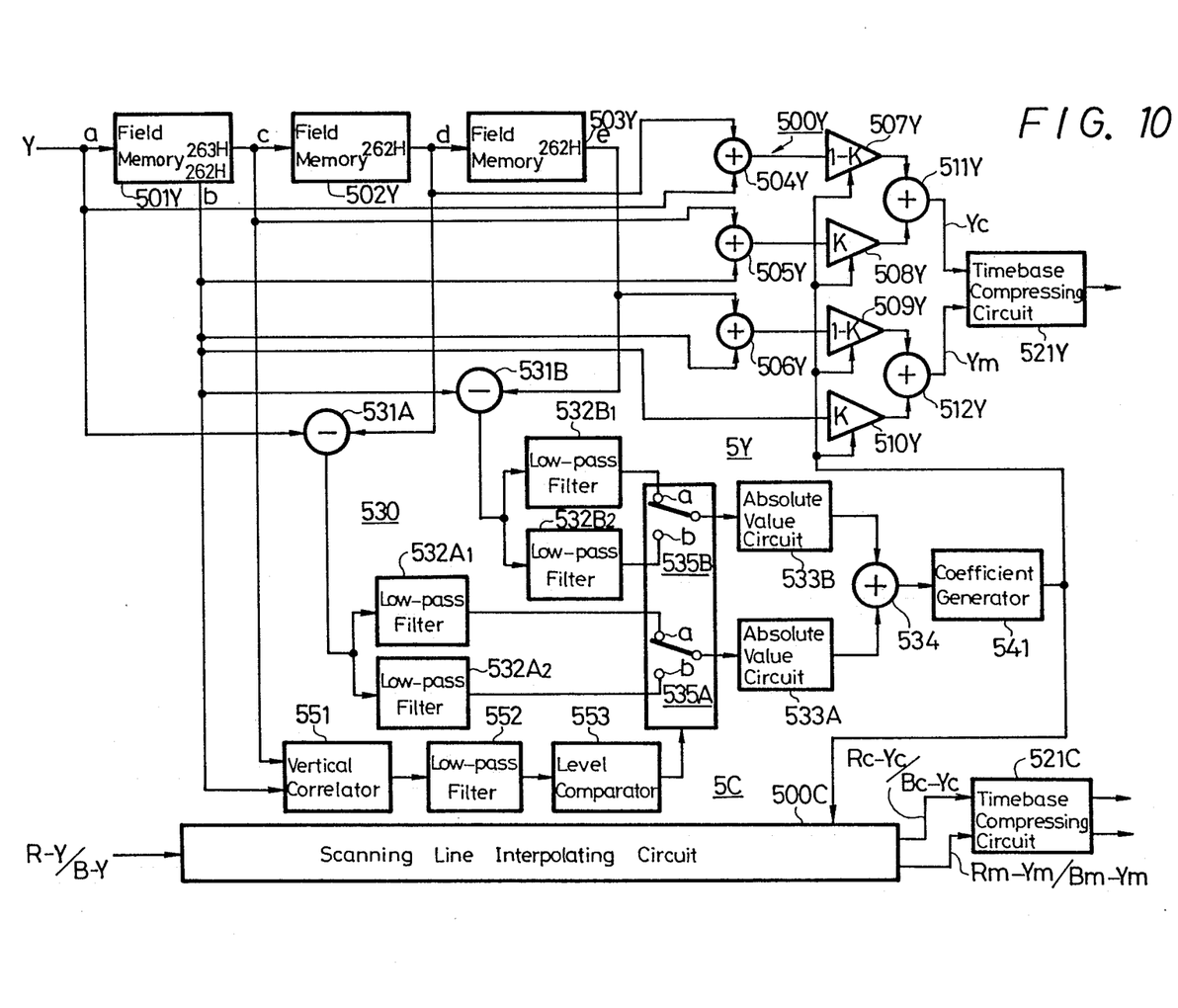
FIG. 10 is a block diagram showing a signal processing circuit which includes a second embodiment of the moving detection circuit according to the present invention.

FIG. 10 illustrates the arrangement of the signal processing circuits 5Y and 5C more fully. First the signal processing circuit 5Y of the luminance signal system will be explained.

As shown in FIG. 10, the luminance signal Y is converted to a digital signal by the A/D converter 3Y (FIG. 9) and is supplied to a field memory 501Y which forms a delay line. The field memory 501Y is formed as a so-called 3-port field memory and has a first output terminal which has a time delay of 263H and a second output terminal which has a time delay of 262H. The output signal developed at the first output terminal of the field memory 501Y is supplied to a field memory 502Y which forms a delay line. The time delay of the field memory 502Y is selected to be 262H. The output signal from the field memory 502Y is supplied to a field memory 503Y which forms a delay line. The time delay of the field memory 503Y is selected to be 262H.

The input signal to the field memory 501Y and the output signal from the field memory 502Y are supplied to an adder 504Y, where they are added and averaged. The output signal from the adder 504Y is multiplied by $1 \times K$ ($K \leq 1$) by a multiplier 507Y, and it then fed to an adder 511Y. The output signals developed at the first and second output terminals are supplied to an adder 505Y where they are added and averaged. The output signal from the adder 505Y is multiplied by K by a multiplier 508Y, and then fed to the adder 511Y. The output signal developed at the second output terminal of the field memory 501Y and the output signal from the field memory 503Y are supplied to an adder 506Y, where they are added and averaged. The output signal from the adder 506Y is multiplied by 1 - K by a multiplier 509Y, and then fed to an adder 512Y. The output signal at the second output terminal of the field memory 501Y is multiplied by K by a multiplier 510Y, and then fed to the adder 512Y.

The value K in the multipliers 507Y through 510Y is controlled by a moving detection signal which will be described later, and the value is changed in response to the amount of movement. By way of example, K =0 for the still picture portion and the maximum value of K is selected to be 1.

The above-mentioned field memories 501Y to 503Y, adders 504Y to 506Y, 511Y and 512Y and multipliers 507Y to 510Y constitute a scanning line interpolating circuit 500Y.

Figure 11:
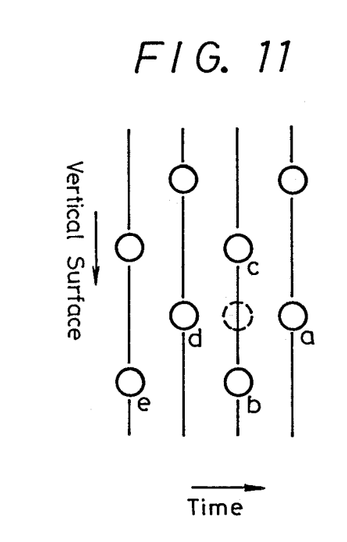
FIG. 11 is a schematic diagram used to explain the scanning line structure of the second embodiment of the invention from a time and vertical surface standpoint.

FIG. 11 is a schematic diagram showing a scanning line structure from a time - vertical surface standpoint, wherein an open circle represents a scanning line of each field. Assuming that in the scanning line interpolating circuit 500Y, a is the input signal to the field memory 501Y, c is the output signal of the first output terminal of the field memory 501Y, b is the output signal at the second output terminal thereof, d is the output signal of the field memory 502Y and e is the output signal from the field memory 503Y, and signals a to e are plotted in a positional relationship such as shown in FIG. 11.

In the scanning line interpolating circuit 500Y, the output signal b at the second output terminal of the field memory 501Y becomes a main scanning line signal of the real moving picture and the output signal b +e/2 of the adder 506Y becomes a main scanning line signal of the still picture portion so that the adder 512Y generates a main scanning line signal Ym in which the main scanning line signals of the real moving picture and the signals of the still picture portion are added with a ratio which corresponds to the amount of the movement. Also, the output signal a +d/2 of the adder 504Y becomes the interpolating scanning line signal of the still picture portion and the output signal b +c/2 of the adder 505Y becomes the interpolating scanning line signal of the real moving picture so that the adder 511Y generates an interpolating scanning line signal Yc in which the interpolating scanning line signals of the real moving picture and of the still picture portion are added with a ratio which corresponds to the amount of movement. The scanning line to be interpolated is set at the position shown by a broken line circle in FIG. 11.

The main scanning line signal Ym and the interpolating scanning line signal Yc from the scanning line interpolating circuit 500Y are supplied to a timebase-compressing circuit 521Y. The timebase-compressing circuit 521Y time-compresses each of the main scanning line signal Ym and the interpolating scanning line signal Yc by one half and successively generates the timebase-compressed signals. In other words, the timebase-compressing circuit 521Y generates the double-speed luminance signal.

As shown in FIG. 10, the input signal to the field memory 501Y and the output signal from the field memory 502Y are supplied to a subtracter 531A where they are subtracted from each other.

The frame difference signal from the subtracter 531A is supplied to low-pass filters 532A$_1$ and 532A$_2$, each of which is used to remove high band noise components and dot interference components. The low-pass filters 532A$_1$ and 532A$_2$ are selected to have filter characteristics which are similar to those of the low-pass filters 14A and 14B shown in the example of FIG. 8. The output signals from the low-pass filters 532A$_1$ and 532A$_2$ are respectively supplied to fixed contacts a and b of a change-over switch 535A. the output signal from the change-over switch 535A is supplied to an absolute value circuit 533A, where it is converted to an absolute value, and is then fed to an adder 534.

The output signals at the second output terminal of the field memory 501Y and the output signal from the field memory 503Y are supplied to a subtracter 531B where they are subtracted from each other.

The frame difference signal from the subtracter 531B is supplied to low-pass filters 532B$_1$ and 532B$_2$ each of which is used to remove the high band noise component and the dot interference component. The filter characteristics of the low-pass filters 532B$_1$ and 532B$_2$ are the same as those of the filters 14A and 14B shown in the example of FIG. 8. The output signals of the filters 532B$_1$ and 532B$_2$ are respectively supplied to fixed contacts a and b of a change-over switch 535B. The output signal from the change-over switch 535B is supplied to an absolute value circuit 533B where it is converted to an absolute value, and is then fed to the adder 534.

In FIG. 10, there is shown a vertical correlator 551 which is supplied with the output signals developed at the first and second output terminals of the field memory 501Y. The vertical correlator 551 generates an absolute value line difference signal. The output signal from the vertical correlator 551 is supplied through a low-pass filter 552 which is used to remove a noise component to a level comparator 553. The level comparator 553 generates a signal of high level "1" when the line difference signal supplied thereto is higher than a predetermined level and a signal of low level "0" when it is lower than the predetermined level. In other words, the level comparator 553 generates a signal of low level "0" in the vertical correlation portion and a signal of high level "1" in the vertical non-correlation portion (vertical edge).

The above-mentioned change-over switches 535A, 535B are controlled by the output signal from the level comparator 553. In the vertical correlation portion, the change-over switches 535A and 535B are each connected to the fixed contact a and in the vertical non-correlation portion to the fixed contact b.

The above-mentioned field memories 501Y to 503Y, the subtracters 531A and 531B, the low-pass filters 532A$_1$, 532A$_2$, 532B$_1$ and 532B$_2$, the absolute value circuits 533A and 533B, the adder 534, the change over switches 535A and 535B, the vertical correlator 551, the low-pass filter 552 and the level comparator 553 constitute a moving detection circuit 530. In this case, the output signal of the adder 534 increases as the movement increases.

The output signal of the adder 534 is supplied to a coefficient generator 541 as the movement detection signal. The value K of the above-mentioned multipliers 507Y through 510Y is generated by the coefficient generator 541 and varies in response to the level of the movement detection signal.

The signal processing circuit 5C of the chrominance signal system will be described next.

The signal processing circuit 5C is formed of a scanning line interpolating circuit 500C and a timebase-compressing circuit 521C. The scanning line interpolating circuit 500C is formed in a manner similar to the scanning line interpolating circuit 500Y in the above-mentioned signal processing circuit 5Y. The value of coefficient of the multiplier in the scanning line interpolating circuit 500C is generated by the coefficient generator 541.

The scanning line interpolating circuit 500C is supplied with the time-division signal R-Y/B-Y of red and blue color difference signals R-Y and B-Y which are converted to digital signals by the A/D converter 3C (see FIG. 9), and circuit 500C generates the main scanning line signal Rm-Ym/Bm-Ym and the interpolating scanning line signal Rc-Yc/Bc-Yc.

The main scanning line signal Rm-Ym/Bm-Ym and the interpolating scanning line signal Rc-Yc/Bc-Yc from the scanning line interpolating circuit 500C are supplied to the timebase-compressing circuit 521C. The timebase-compressing circuit 521C time-compresses each of the main scanning line signal Rm-Ym/Bm-Ym and the interpolating scanning line signal Rc-Yc/Bc-Yc by one half and successively generates the timebase-compressed signals. In this case, the timebase-compressing circuit 521C separately generates the red and blue color difference signals. The timebase-compressing circuit 521C generates as a result the double-speed color difference signals.

In the scanning line interpolating circuit 500Y, the main scanning line signal b +e/2 and the interpolating scanning line signal a +d/2 of the still picture portion are respectively the average signals in the frame so that the dot interference components (chrominance signal components) contained in the luminance signal Y cancel out each other. Also, in the scanning line interpolating circuit 500C, similar signal processings are carried out, whereby the cross color components contained in the time-division signal R-/B-Y cancel out each other. In other words, the chrominance signal derived from the Y/C separating circuit 2 (see FIG. 9) is expressed by a conceptual equation of $Y_H + C_0 \sin 2\pi fsc\, t$ where ay$_H$ is the luminance signal component and fsc is the color subcarrier frequency. Thus, when this chrominance signal is decoded, it is expressed by the following equation.

Chrominance signal $\times \sin 2\pi fsc\, 5 = Y_H \sin 2\pi fsc\, t + C^0$

Thus, the cross color component $Y_H \cdot \sin 2\pi fsc\, t$ will be equiphase with the chrominance signal component and is in a phase-inverted relationship between the frames so that it is cancelled and removed by the scanning line interpolating circuit 500C.

Also, in the scanning line interpolating circuits 500Y and 500C, the interframe adding processing is carried out for the still picture portion, whereby the random noise in the time direction is reduced to $1/\sqrt{2}$. Hence, the signal-to-noise (S/N) ratios of the luminance signal and the chrominance signal are increased.

Figure 12A:
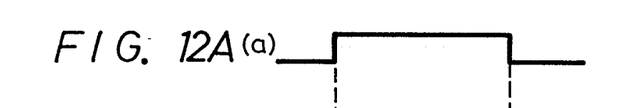
FIGS. 12A through 12G are, respectively, schematic diagrams used to explain the operation of the second embodiment of the moving detection circuit according to the present invention.
Figure 12B:
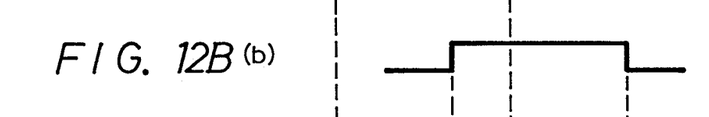
Figure 12C:
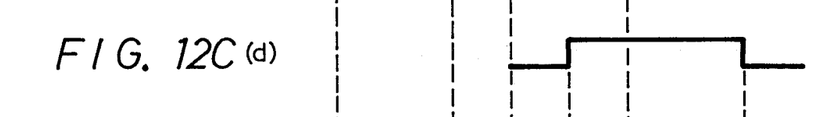
Figure 12D:
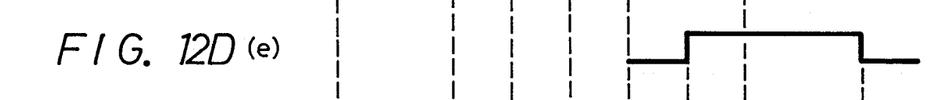
Figure 12E:
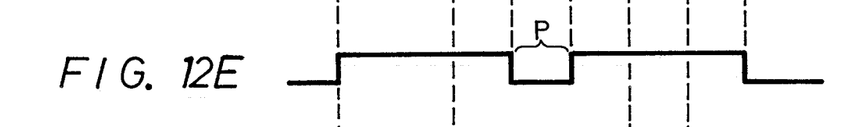
Figure 12F:
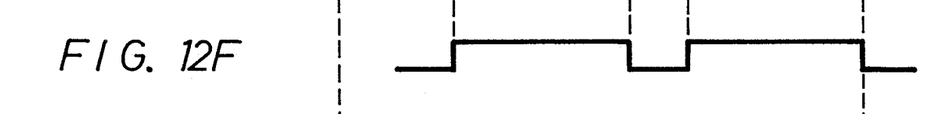
Figure 12G:
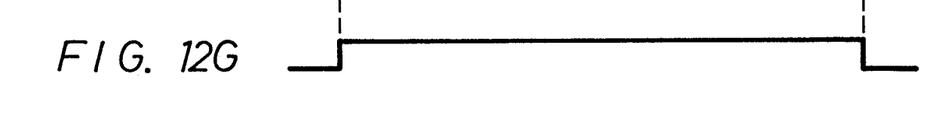

Further, since the moving detection circuit 530 generates the moving detection signal from two frame difference signals, it is possible to detect the quick motion between the fields (1/60 second). For example, when the signals a, b, c and d are represented as shown in FIGS. 12A, 12B, 12C and 12D, respectively, the output signals from the subtracters 531A and 531B respectively become as shown in FIGS. 12E and 12F. Consequently, the portion P is determined as the still picture portion by the output signal from the subtracter 531A so that the movement between the fields cannot be detected. Thus, with the employment of the output signal from the subtracter 531B, the moving detection signal becomes as sown in FIG. 12G so that the quick motion between the fields can be detected.

According to the present embodiment of the moving detection circuit thus arranged, in the moving detection circuit 530, the low-pass filters $532A_2$ and $532B_2$ which have steep attenuation factors are used with respect to the vertical non-correlation portion (vertical edge) while the low-pass filters $532A_1$ and $532B_1$ which have gentle attenuation factor are used with respect to the vertical correlation portion (not the vertical edge), whereby an action and effect similar to those of the example shown in FIG. 8 are achieved.

While in the above-mentioned embodiment the two low-pass filters are controlled by switches, the present invention can be modified such that filters having various characteristics are selectively switched in response to the degree of vertical correlation in a similar fashion.

The most specific feature of a third embodiment of the present invention is that a television signal has a large correlation in the vertical direction and movement can be detected even by the field difference signal in the vertical correlation portion. The third embodiment of the moving detection circuit according to the present invention will be described hereinunder with reference to FIG. 13.

Figure 13:
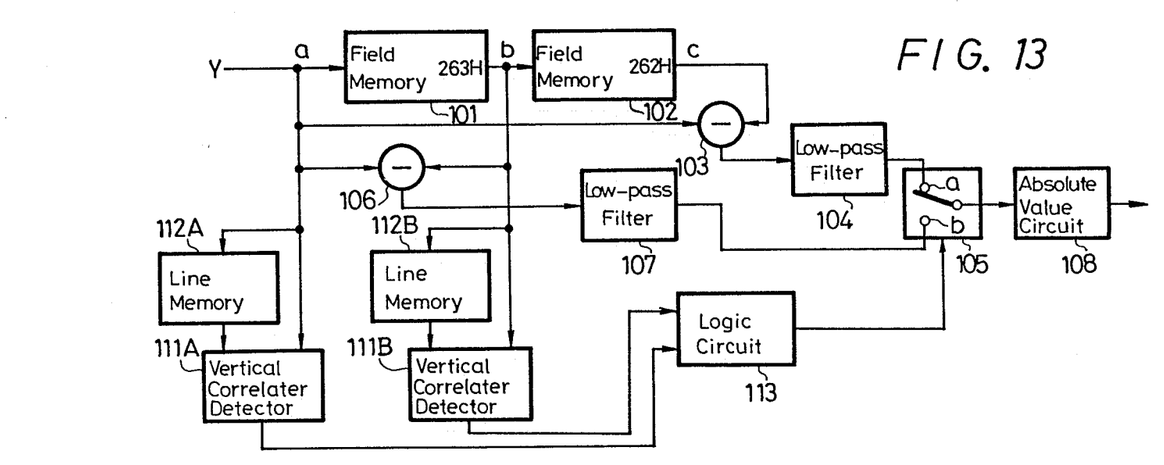
FIG. 13 is a block diagram showing a third embodiment of the moving detection circuit according to the present invention.

Referring to FIG. 13, the luminance signal Y which has been separated from the input video signal by the Y/C separating circuit is supplied to a field memory 101 which forms a delay line and the time delay of the field memory 101 is selected to be 263H. The output signal from the field memory 101 is supplied to a field memory 102 and the time delay of the field memory 102 is selected to be 262H. Thus, the time delay of the series circuit of the field memories 101 and 102 is selected to be one frame (263H +262H).

The input signal to the field memory 101 and the output signal from the field memory 102 are supplied to a subtracter 103, where they are subtracted from each other. The frame difference signal from the subtracter 103 is supplied through a low-pass filter 104 to a fixed contact a of a change-over switch 105. The low-pass filter 104 is used to remove a high band noise component and a dot interference component.

The input signal and the output signal of the field memory 101 are supplied to a subtracter 106 and are subtracted from each other. The field difference signal from the subtracter 106 is supplied through a low-pass filter 107 to a fixed contact b of a change-over switch 105. The low-pass filter 107 is used to remove a high band noise component and a dot interference component.

The output signal from the change-over switch 105 is converted to an absolute value by an absolute value circuit 108. The output signal of the absolute value circuit 108 is used as a moving detection signal.

In FIG. 13, reference numeral 111A denotes a vertical correlation detector which is directly supplied with the input signal of the field memory 101 or via a line memory 112A which forms a delay line. The vertical correlation detector 111A detects the existence or nonexistence of the vertical correlation on the basis of the line difference signal. The vertical correlation detector 111A generates a signal of low level "0" in response to, for example, the vertical correlation portion and a signal of high level "1" in response to the vertical non-correlation portion. A vertical correlation detector 111B is directly supplied with the output signal of the field memory 101 or via a line memory 112B which forms a delay line. The vertical correlation detector 111B detects the existence or nonexistence of the vertical correlation on the basis of the line difference signal. The vertical correlation detector 111B generates a signal of low level "0" in response to, for example, the vertical correlation portion and a signal of high level "1" in response to the vertical non-correlation portion.

The output signals of the vertical correlation detectors 111A and 111B are calculated by a logic circuit 113. The output signal from the logic circuit 113 is used to control the above-mentioned change-over switch 105 so that the position of switch 105 is changed at a predetermined timing. That is, when the vertical non-correlation portion is detected by any one of the vertical correlation detectors 111A and 111B, the change-over switch 105 is connected to the fixed contact a. The change-over switch 105 is connected to the fixed contact b for other cases.

According to this embodiment, when the vertical noncorrelation portion is not detected by any one of the vertical correlation detectors 111A and 111B, or in the vertical correlation portion, the change-over switch 105 is connected to the fixed contact b thereof, whereby the field difference signal, which is the output signal from the subtracter 106, is delivered through the low-pass filter 107, the change-over switch 105 and the absolute value circuit 108 as the moving detection signal. According to this embodiment, it is possible to detect quick motion at the field frequency unit.

Figure 14:
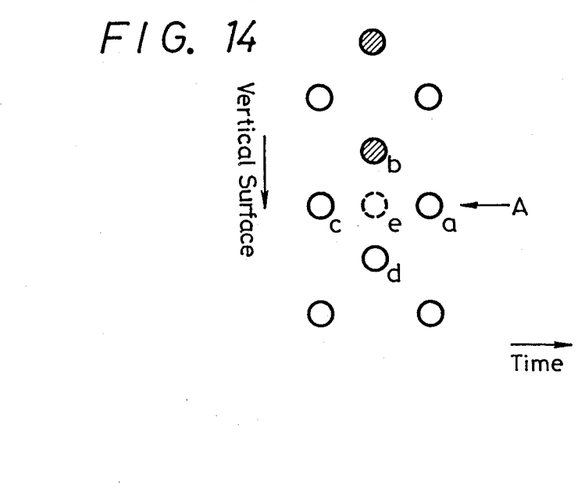
FIG. 14 is a schematic diagram showing a scanning line structure in the third embodiment of the present invention from a time and vertical surface standpoint.
Figure 15:
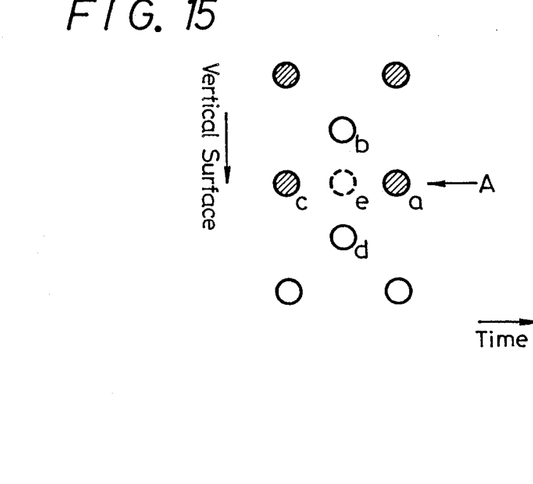
FIG. 15 is a schematic diagram showing a scanning line structure of time and vertical surface in the vertical noncorrelation mode of the third embodiment of the moving detection circuit according to the present invention.

FIGS. 14 and 15 each illustrate a scanning line structure from a time-vertical surface standpoint, wherein an open circle and a hatched circle represent white and black main scanning lines, respectively. Assuming that a is the input signal of the field memory 101, b is the output signal thereof, c is the output signal of the field memory 102 and d is the signal advanced from the signal b by one horizontal line period in FIG. 13, then these signals a to d are set in positional relationships shown in FIGS. 14 and 15.

Let it be assumed that the output signal b of the field memory 101 is a signal of the vertical edge as shown in FIG. 14. In this case, if the field difference signal is used as the moving detection signal, then the moving detection signal is represented as $|a-b| \neq 0$, resulting in the real moving picture mode. Thus, the signal e on the interpolating scanning line to be interpolated at the portion shown by a broken line open circle shown in FIG. 14 becomes, for example, $\frac{1}{2}(b+d)$, resulting in line flicker being produced on the line as viewed from the direction A.

With the above-mentioned circuit arrangement shown in FIG. 13, when the vertical non-correlation portion (vertical edge) is detected by the vertical correlation detector 111B, the change-over switch 105 is connected to the fixed contact a so that the frame difference signal, which is the output signal from the subtracter 103, is delivered through the lowpass filter 104, the change-over switch 105 and the absolute value circuit 108 as the moving detection signal. If the frame difference signal is employed as the moving detection signal, the moving detection signal is represented as $|a-c|=0$, resulting in the still picture mode. Thus, the signal e of the interpolating scanning line to be interpolated at the portion shown by a broken line open circle in FIG. 14 becomes, for example, a which avoid the occurrence of line flicker.

Let us now consider that the input signal to the field memory 101 is the signal at the vertical edge as shown in FIG. 15. In this case, if the field difference signal is used as the moving detection signal, the moving detection signal is represented as $|a-b|\neq 0$, resulting in the real moving picture mode. Thus, the signal e on the interpolating scanning line to be interpolated at the portion shown by a broken line open circle in FIG. 15 becomes, for example, $\frac{1}{2}(b+d)$ so that the line flicker occurs on the line as viewed from the direction A.

With the above-mentioned circuit arrangement, when the vertical non-correlation portion (vertical edge) is detected by the vertical correlation detector 111A, the change-over switch 105 is connected to the fixed contact a so that the frame difference signal, which is the output signal from the subtracter 103, is delivered through the low-pass filter 104, the change-over switch 105 and the absolute value circuit 108 as the moving detection signal. If the frame difference signal is employed as the moving detection signal, then the moving detection signal is represented as $|a-c|\neq 0$, resulting in the still picture mode. Thus, the signal e on the interpolating scanning line to be interpolated at the portion shown by a broken line open circle in FIG. 15 becomes, as for example, a, thus avoiding line flicker.

Figure 16:
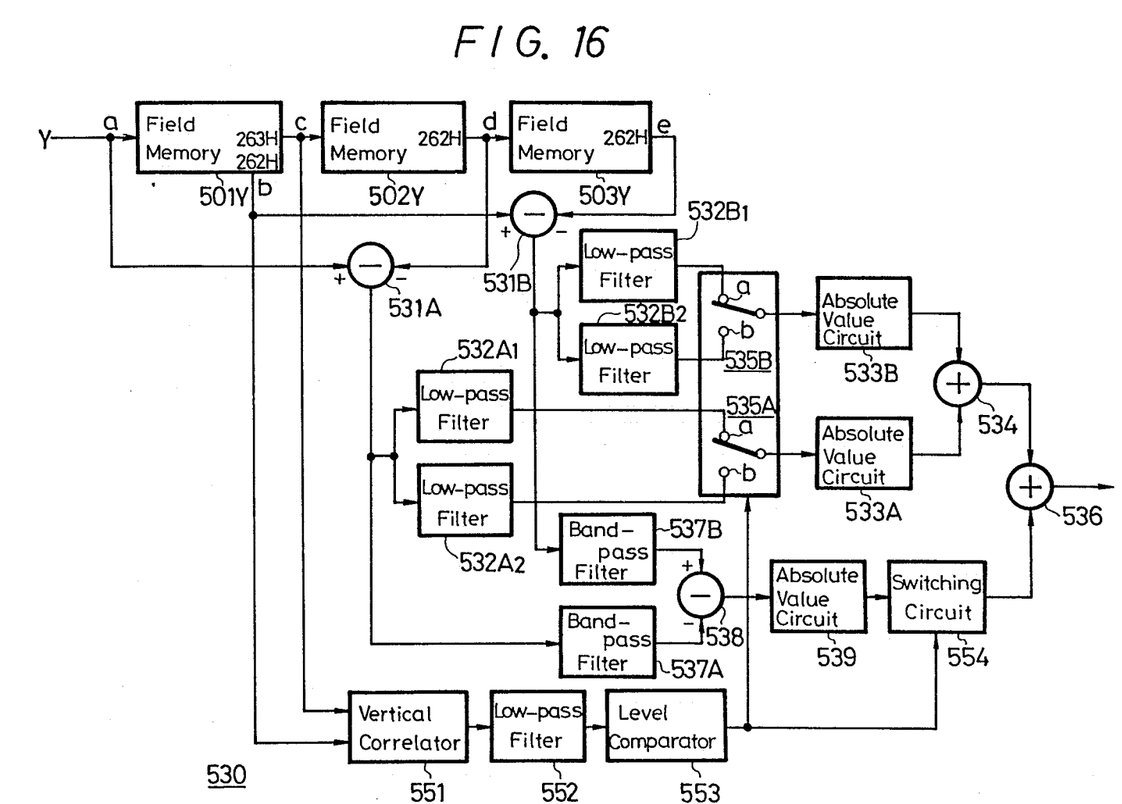
FIG. 16 is a block diagram showing a fourth embodiment of the moving detection circuit according to the present invention.

FIG. 16 illustrates a fourth embodiment of the moving detection circuit 530 according to the present invention.

As sown in FIG. 16, the field memories 510Y to 503Y of the scanning line interpolating circuit 500Y in the example shown in FIG. 10 are also used as the field memories 501Y to 503Y in FIG. 16.

Referring to FIG. 16, the input signal to the field memory 501Y and the output signal from the field memory 502Y are supplied to the subtracter 531A, where they are subtracted each other.

The frame difference signal from the subtracter 531A is supplied to low-pass filters 532A$_1$ and 532A$_2$, which are used to remove a high band noise component and a dot interference component. The low-pass filter 532A$_1$ might be a COS filter which has a low frequency response of around 3.58 MHz which corresponds to a frequency of, for example, a dot interference component. The frequency characteristic of the low-pass filter 532A$_1$ is represented by the solid line a in FIG. 5. The low-pass filter 532A$_2$ might be a COS$^2$ filter whose response characteristic may be low around 3.58MHz which corresponds to the frequency of, for example, a dot interference component. The frequency characteristic of the low-pass filter 532A$_2$ is represented by the broken line b in FIG. 5.

The output signals of the low-pass filters 532A$_1$ and 532A$_2$ are supplied to fixed contacts a and b of a change-over switch 535A, respectively. The output signal from the changeover switch 535A is supplied to an absolute value circuit 533A, where it is converted to an absolute value and is then fed to an adder 534.

The output signals at the second output terminal of the field memory 501Y and of the field memory 503Y are supplied to the subtracter 531B and are subtracted from each other.

A frame difference signal from the subtracter 531B is supplied to low-pass filter 532B$_1$ and 532B$_2$ which are used to remove a high band noise component and a dot interference component. The characteristics of the low-pass filters 532B$_1$ and 532B$_2$ are selected to be similar to those of the low-pass filters 532A$_1$ and 532A$_2$, respectively. The output signals of the filters 532B$_1$ and 532B$_2$ are supplied to fixed contacts a and b of a change-over switch 535B, respectively. The output signal from the change-over switch 535B is converted to an absolute value by an absolute value circuit 533B and is then fed to the adder 534.

The output signal of adder 534 is supplied to an adder 536 as a low band moving detection signal.

The output signals of the subtracters 531A and 531B are respectively supplied through band-pass filters 537A and 537B to a subtracter 538. The center frequencies of the band-pass filters 537A and 537B are each selected to be 3.58 MHz which corresponds to the frequency of the chrominance signal component. The output signal of the subtracter 538 is converted to an absolute value by an absolute value circuit 539, and is then supplied through a switching circuit 554 to the adder 536 as a high band moving detection signal. The output signal of the adder 536 is the moving detection signal.

In FIG. 16, reference numeral 551 designates a vertical correlator. The vertical correlator 551 is supplied with the output signals of the first and second output terminals of the field memory 501Y. The vertical correlator 551 generates an absolute value signal of the line difference signal. The output signal of the vertical correlator 551 is supplied through a low-pass filter 552 to a level comparator 553. The low-pass filter 552 is used to remove noise components. The level comparator 553 generates a signal of high level "1" when the line difference signal supplied thereto is higher than a predetermined level and a signal of low level "0" when it is lower than the predetermined level. In other words, the level comparator 553 generates a signal of low level "0" for the vertical correlation portion and a signal of high level "1" for the vertical non-correlation portion (vertical edge).

The change-over switches 535A and 535B are controlled so as to change position by the output signal from the level comparator 553 so that the moveable contacts are connected to the fixed contact a for the vertical correlation portion and to the fixed contact b for the vertical non-correlation portion.

The above-mentioned switching circuit 554 is controlled by the output signal of the level comparator 553 so that it supplies its input signal for the vertical correlation portion and supplies a zero output signal from the vertical noncorrelation portion.

Figure 17A:
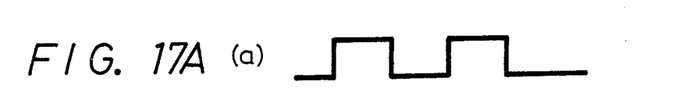
FIGS. 17A to 17H are respectively schematic diagrams used to explain how the fourth embodiment of the moving detection circuit of the present invention is effectively operated to detect a high band component.
Figure 17B:
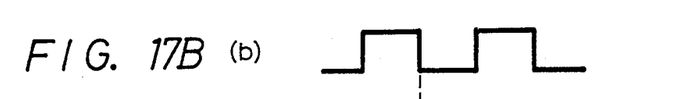
Figure 17C:
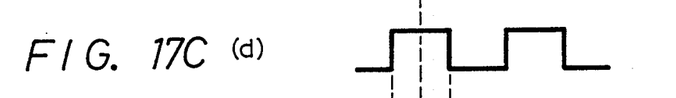
Figure 17D:
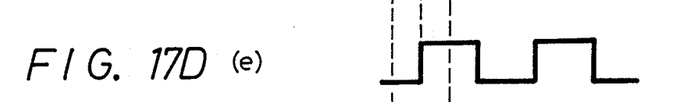
Figure 17E:
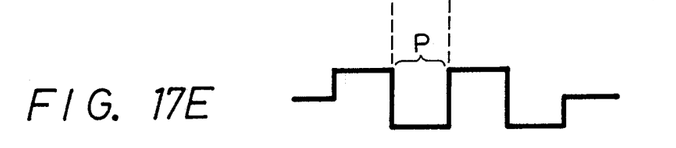
Figure 17F:
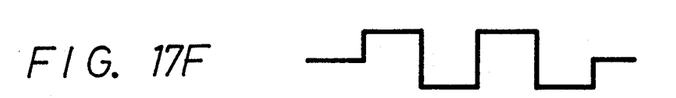
Figure 17G:
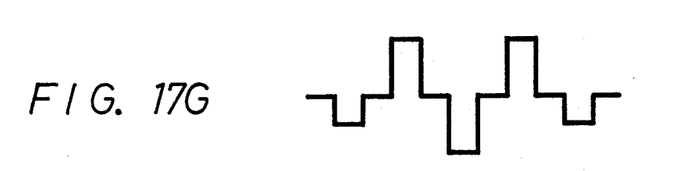

The above-mentioned moving detection circuit 530 obtains a low band moving detection signal by adding the two frame difference signals so that it is possible to detect a quick motion between the fields (1/60 second). For example, when the signals a, b, d and e are, respectively as represented in FIGS. 17A, 17B, 17C and 17D, the output signals of the subtracters 531A and 531B are represented as shown in FIGS. 17E and 17F, respectively. Consequently, the portion P is determined as the still picture portion from only the output signal of the subtracter 531A, which makes it impossible to detect motion between the fields. Thus, with the employment of the output signal from the subtracter 531B, the moving detection signal is as shown in FIG. 17G, where quick movements between the fields can be detected.

Further, at the vertical non-correlation portion (vertical edge), the low-pass filters $532A_2$ and $532B_2$ each have a steep attenuation characteristic, while at the vertical correlation portion (portion which is not the vertical edge), the low-pass filters $532A_1$ and $532B_1$ are utilized, so that the dot interference component can be effectively removed and also, movement of relatively high frequency can be sufficiently detected.

Figure 18:
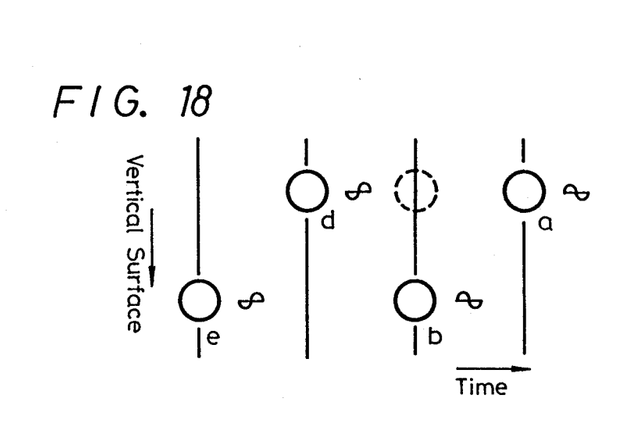
FIG. 18 is a schematic diagram of a scanning line structure of time and vertical surface in the vertical correlation mode of the fourth embodiment of the moving detection circuit according to the present invention from a phase relationship of high band component standpoint.
Figures 19A, 19B, 19C:
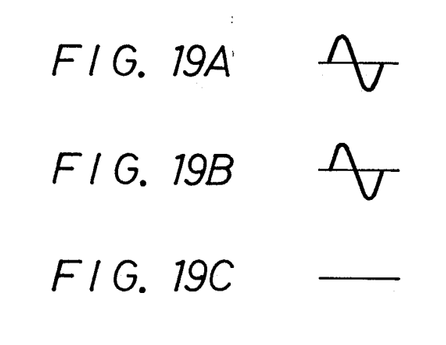
FIGS. 19A to 19C are respectively schematic diagrams used to explain that high band components cancel each other out in the vertical correlation mode in the fourth embodiment of the moving detection circuit according to the present invention.

The band-pass filters 537A and 537B generate the high band components of the frame difference signals, and the subtracter 538 generates a difference signal of the frame difference signals. In this case, as shown in FIG. 18, the dot interference components (chrominance signal components) have a phase-inverted relationship between the frames and between the lines so that the high band components of the frame difference signals derived from the band-pass filters 537A and 537B, respectively, contain the dot interference components. In case of a still picture, these dot interference components become equal in amplitude and phase as shown in FIGS. 19A and 19B, and the difference signal from the subtracter 538 becomes zero as shown in FIG. 19C.

Thus, the detection error due to the dot interference component can be avoided and the high band moving detection signal can be satisfactorily obtained.

Figure 20:
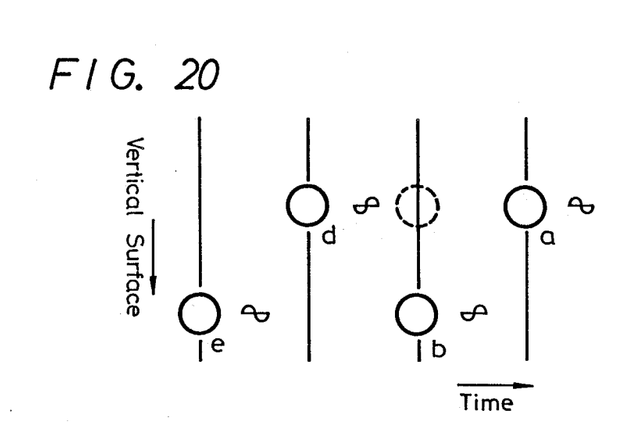
FIG. 20 is a schematic diagram of a scanning line structure of time and vertical surface of vertical noncorrelation mode of the fourth embodiment of the moving detection circuit according to the present invention from a phase relationship of the high band component standpoint.
Figures 21A, 21B:
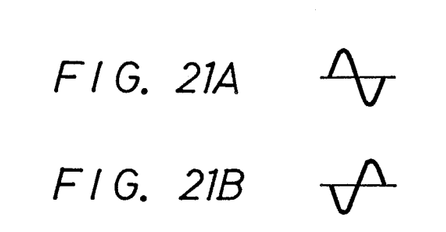
FIGS. 21A to 21C are respectively schematic diagrams used to explain that in the fourth embodiment of the moving detection circuit according to the present invention, the high band component causes a detection error in the vertical noncorrelation mode.
Figure 21C:
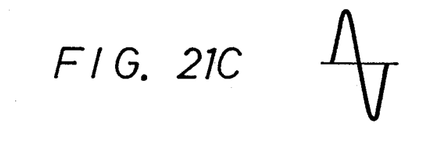

Further, in the vertical non-correlation portion, the chrominance signal components are not inverted between the lines as shown in FIG. 20, and the dot interference components contained in the high band components of the frame difference signals from the band-pass filters 537A and 537B do not become equal in amplitude and phase as shown in FIGS. 21A and 21B even for a still picture. The difference signal from the subtracter 538 is as a result represented in FIG. 21C and forms a detection error signal. In the example shown in FIG. 16, in the vertical non-correlation portion, the switching circuit 554 produces a zero output signal, and the difference signal is not used as the moving detection signal. It is therefore possible to prevent detection errors from being caused because of the dot interference component.

In FIGS. 18 and 20, the open circle represents the scanning line of each field, the broken line circle the position of the scanning line which is to be interpolated, and the symbols ∞ and ∞, the phases of the dot interference components, respectively.

FIG. 17 shows the pattern by which the moving detection signal cannot be obtained in the moving detection operation of the low band, and the moving detection signal can be obtained in the moving detection operation of the high band. FIGS. 17A, 17B, 17C and 17D, respectively, illustrate the input signal to the field memory 510Y and the output signals of the field memories 501Y, 502Y and 503Y shown in FIG. 16. For that condition, the output signals of the subtracters 531A and 531B are as shown in FIGS. 17E and 17F, respectively.

Figure 17H:
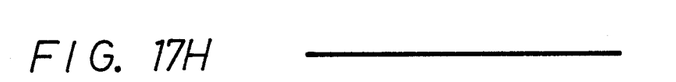

The output signals of the subtracters 531A and 531B are not delivered from the low-pass filters $532A_1$, $532A_2$, $532B_1$ and $532B_2$, and the low band moving detection signal from the adder 534 becomes zero as shown in FIG. 17H. The output signals of the subtracters 531A and 531B are delivered from the band-pass filters 537A and 537B, and the high band moving detection signal from the subtracter 538 is as shown in FIG. 17G. Also, the frequencies of the output signals (shown in FIGS. 17E and 17F) from the subtracters 531A and 531B are frequencies outside the pass bands of the low-pass filters $532A_1$, $532A_2$, $532B_1$ and $532B_2$.

In the above-mentioned embodiments, the high band moving detection signal is obtained from the luminance signal which has been separated from the video signal by the Y/C separating circuit. If the input signal, for example, is a composite video signal, then it is possible to detect the movement of the chrominance signal C as well as the movement of the luminance signal Y in the high band.

While in the above-mentioned embodiments the band-pass filters 537A and 537B are employed, the band-pass filters 537A and 537B may be replaced with high-pass filters. The filters used need only be filters which can block a signal of a low frequency band.

According to the present invention, as set out above, since the filters for passing the frame difference signals are switched by the output signals from the vertical correlation detectors, the dot interference component (chrominance signal component) at the vertical edge can be effectively removed and movement of relatively high frequency can be adequately detected.

Further, according to the present invention, since the field difference signal is used as the moving detection signal for the vertical correlation portion, it is possible to detect quick motion of the field frequency unit. In addition, since the frame difference signal is used as the moving detection signal for the vertical non-correlation portion, detection errors can be prevented and also line flicker or the like can be prevented.

Furthermore, according to the present invention, since the first and second frame difference signals which each have a time difference of one field period are obtained from the video signal and the difference signals of high band components are used as the high band moving detection signals, the high band moving detection signal can be obtained without causing detection errors due to the chrominance signal components (dot interference components). Thus, as compared with moving detection using only the low frequency band, it is possible to substantially increase the detection capability of the moving detection circuit. Further, since the switching means is controlled for the vertical non-correlation portion so that the difference signal of the high band component is not used as the moving detection signal, it is possible to avoid the occurrence of detection errors.

It should be understood that the above description is presented by way of example for the preferred embodiments of the invention and it will be apparent that many modifications and variations thereof could be effected by one skilled in the art without departing from the spirit and the scope of the novel concepts of the invention so that the scope of the invention should be determined only by the appended claims.

We claim as my invention:

1. A moving detection circuit comprising, a difference signal generator which includes at least a frame delay circuit, a vertical correlation detector connected to said difference signal generator comprising; (1) a plurality of filters connected to said difference signal generator; (2) switching means connected to said plurality of filters so as to allow the output of one of said filters to be selected; (3) control means connected to said vertical correlation detector and controlling said switching means in response to the output level of said vertical correlation detector, and wherein said plurality of filters are low-pass filters which have different frequency response characteristics.

2. A moving detection circuit according to claim 1, further comprising a band-pass or highpass filter which is connected to said difference signal generator.

3. A moving detection circuit according to claim 1, wherein said difference signal generator comprises a frame delay circuit and a subtracter which is connected to the input and output of said frame delay circuit.

4. A moving detection circuit according to claim 3, wherein said frame delay circuit includes one horizontal line time delay circuit so as to supply a signal to said vertical correlation detector.

5. A moving detection circuit according to claim 3, wherein said frame delay circuit comprises a field memory which has a 263 horizontal line time delay, and a field memory which has a 262 horizontal line time delay.

6. A moving detection circuit comprising, a difference signal generator which includes at least a frame delay circuit, a vertical correlation detector connected to said difference signal generator comprising; (1) a plurality of filters connected to said difference signal generator; (2) switching means connected to said plurality of filters so as to allow the output of one of said filters to be selected; (3) control means connected to said vertical correlation detector and controlling said switching means in response to the output level of said vertical correlation detector, and wherein said plurality of filters include combinations of low-pass filters which have different frequency response characteristics.

7. A moving detection circuit according to claim 6, wherein said switching means consist of a plurality of switches which correspond to said combinations of low-pass filters.

8. A moving detection circuit according to claim 7, further comprising, an adder which is connected to the outputs of said plurality of switches.

9. A moving detection circuit according to claim 6, further comprising a plurality of band-pass or high-pass filters which are connected to said difference signal generator.

10. A moving detection circuit according to claim 9, further comprising a subtracter which is connected to the outputs of said plurality of band-pass or high-pass filters.

11. A moving detection circuit comprising, a difference signal generator which includes at least a frame delay circuit, a vertical correlation detector connected to said difference signal generator comprising; (1) a plurality of filters connected to said difference signal generator; (2) switching means connected to said plurality of filters so as to allow the output of one of said filters to be selected; (3) control means connected to said vertical correlation detector and controlling said switching means in response to the output level of said vertical correlation detector, and wherein said difference signal generator comprises three field delay circuits which are connected in series and two subtracters which are connected to said field delay circuits.

12. A moving detection circuit according to claim 11, wherein said three field delay circuits consist of first, second and third field delay circuits which are connected in series, and said two subtracters consist of a first subtracter which is connected to the input of said first field delay circuit and to the output of said second field delay circuit, and a second subtracter which is connected to the input of said second field delay circuit and to the output of said third field delay circuit.

13. A moving detection circuit according to claim 11, wherein one of said three field delay circuits includes one horizontal line time delay circuit so as to supply a signal to said vertical correlation detector.

14. A moving detection circuit comprising, a difference signal generator which includes at least a frame delay circuit, a vertical correlation detector connected to said difference signal generator comprising; (1) a plurality of filters connected to said difference signal generator; (2) switching means connected to said plurality of filters so as to allow the output of one of said filters to be selected; (3) control means connected to said vertical correlation detector and controlling said switching means in response to the output level of said vertical correlation detector, and wherein said difference signal generator comprises two field delay circuits which are connected in series and two subtractors of which one is connected to said two field delay circuits for generating field and frame difference signals.

* * * * *